United States Patent Office 2,838,796
Patented June 17, 1958

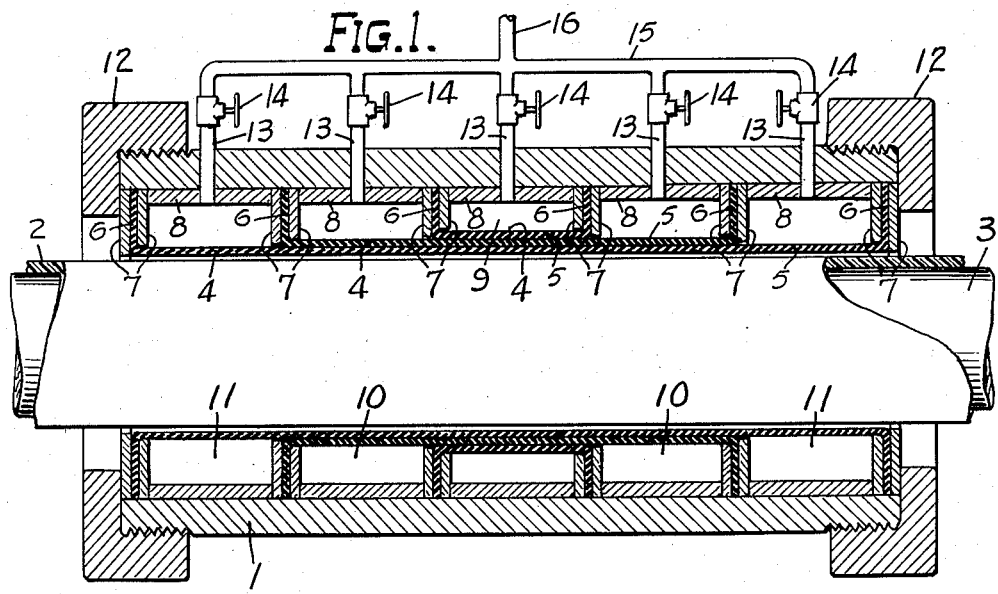
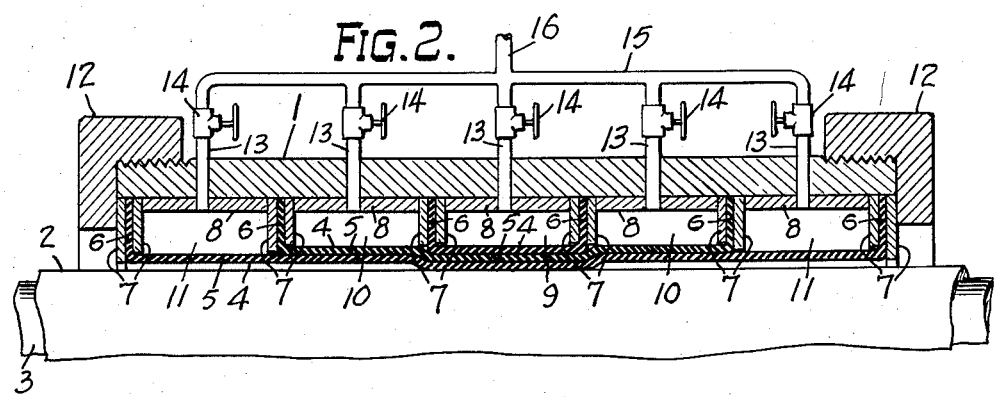
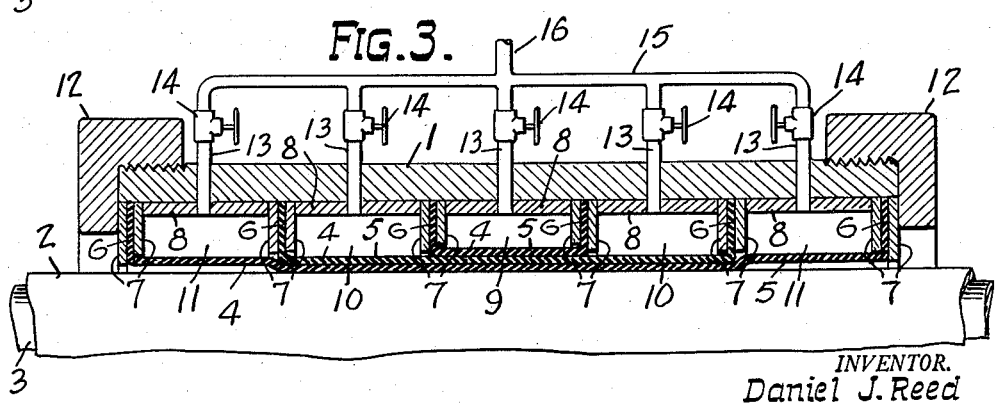

2,838,796

METHOD AND APPARATUS FOR PRESSURE CURING OF MATERIALS

Daniel J. Reed, Milwaukee, Wis., assignor to A. O. Smith Corporation, Milwaukee, Wis., a corporation of New York Application December 2, 1954, Serial No. 472,635

7 Claims. (Cl. 18—19)

This invention relates to the pressure curing of materials and more particularly to pressure curing of fiber-reinforced resin articles.

In the manufacture of fiber-reinforced resin articles, such as pipe, a critical property which determines to a large measure the strength and water resistance of the pipe is the bond between the resin and the glass fibers. It has been found that the bond between the fibers and certain types of resins, such as condensation polymers, can be improved by curing the pipe under pressure. The improved bond correspondingly increases the strength and water resistance of the pipe.

The present invention is based on the discovery that the bond between the resin and the fibers can be further improved by substantially removing the air entrapped in the resin and in the fibers during the pressure curing operation. By removing the entrapped air, the surface area of the bond between the resin and the fibers is increased. Increasing the surface area of the bond results in an overall increase in the strength of the bond and a corresponding increase in the strength and water resistance of the pipe.

According to the present invention, pressure is initially applied to the external surface of a small length of an uncured fiber-reinforced resin pipe on a mandrel, and the pressure tends to drive the entrapped air outwardly toward the ends of the pressurized length. Thereafter pressure is applied to adjacent lengths of the pipe on either side of the original length, while maintaining the pressure on the original length, to drive the entrapped air longitudinally outwardly toward the ends of the pipe. This progressive application of pressure is continued with the entrapped air being forced outwardly toward the ends of the pipe until the entire length of the uncured pipe is subjected to the pressure. The pressure is maintained on the pipe until the curing cycle is completed.

The apparatus for progressively applying pressure to the pipe comprises a hollow cylindrical casing which is adapted to receive a length of the pipe to be cured. A plurality of superposed flexible sleeves are disposed within the casing and the ends of the sleeves are disposed in sealing engagement with the inner wall of the casing to provide a series of annular fluid-tight chambers extending the length of the casing.

The superposed flexible sleeves have progressively greater lengths with the outermost of the sleeves having the smallest length and each inwardly succeeding sleeve having a greater length and extending outwardly a substantial distance beyond both ends of the preceding outer sleeve. By this construction, the outer sleeve, which has the shortest length, defines a chamber disposed centrally of the length of the casing and each succeeding underlaying sleeve defines a pair of connecting chambers on either end of the chamber defined by the overlaying sleeve. Fluid pressure is initially introduced into the chamber disposed centrally of the length of the casing, and the pressure exerts a force against the pipe to drive the air entrapped in the resin and fibers longitudinally of the pipe. While maintaining the pressure in the central chambers, the fluid pressure is then introduced into the adjacent chambers, forcing the air longitudinally outwardly, and this procedure of progressively introducing pressure into successive chambers to drive the entrapped air longitudinally toward the ends of the casing is repeated. The pressure is maintained in all of the chambers of the series until the resin pipe has been completely cured.

By progressively applying pressure to the pipe from the longitudinal center of the casing to the ends thereof, the air entrapped in the resin and fibers is substantially removed. This removal of the entrapped air results in an improved bond between the resin and the fibers and provides a pipe having increased strength and water resistance.

The accompanying drawing illustrates the best mode presently contemplated for carrying out the invention.

In the drawing:

Figure 1 is a vertical section of the apparatus of the present invention showing the pipe to be cured disposed within the casing;

Fig. 2 is a fragmentary vertical section of the apparatus in which fluid pressure is applied through the central longitudinal chamber to the pipe; and Fig. 3 is a view similar to Fig. 2 in which fluid pressure is applied to the pipe through the chambers adjacent the central chamber while maintaining the pressure within said central chamber.

The drawing illustrates an apparatus for applying pressure to the external surface of an uncured plastic, elongated article such as a pipe section during the curing of the plastic material in order to increase the strength and water resistance of the article.

The apparatus comprises a generally cylindrical casing 1 which is adapted to receive a length of the pipe 2 or other elongated article to be cured. The pipe is fabricated from long reinforcing fibers which are wound on a mandrel 3 and are impregnated with a liquid uncured thermo-setting resin. Pressure is applied to the outer surface of the pipe 2 against the internal support of mandrel 3 by the present invention during curing of the resin to form a resin-bonded fibrous structure.

The fluid pressure is applied to the outer surface of pipe 2 through a plurality of flexible, resilient sleeves 4 which are superposed within the casing and define a series of fluid-tight chambers extending longitudinally of the casing. Fluid pressure is introduced progressively from the central chamber longitudinally outwardly in the adjacent chambers to the ends of the casing. By this method of exerting pressure against the pipe, the air entrapped in the pipe is driven outwardly ahead of the pressure to the ends of the casing.

Each of the flexible sleeves 4 is formed with a body portion 5 disposed concentrically of the pipe 2 and is provided with flanged end portions 6 which extend outwardly substantially normally to the body portion 5 and are disposed in sealing engagement with the inner wall of casing 1.

The flanged end portions 6 of each of the sleeves 4 are stiffened by a pair of rings 7 which are disposed edgewise with respect to the inner wall of casing 1 and are positioned on either side of the respective end portions 6.

To space the end portions 6 longitudinally of casing 1 spacer rings 8 are disposed contiguously of the inner wall of the casing and extend between each pair of adjacent rings 7.

The outermost of the sleeves 4 has the shortest length and defines a fluid-tight chamber 9 at the longitudinal center of the casing 1. The next succeeding inner sleeve 4 has a greater length than the outer adjacent sleeve and projects longitudinally beyond the outer adjacent sleeve to define a pair of connecting fluid-tight chambers 10 on either side of chamber 9.

As shown in the drawing, the innermost of the sleeves 4 has the greatest length and projects longitudinally beyond the ends of the next adjacent sleeve to provide a pair of connecting chambers 11 adjacent the chambers 10.

As the body portion 5 of the flexible sleeve defining chambers 10 extends longitudinally beyond the sleeve defining chamber 9, the chambers 10 are connected and thereby provide a continuous surface through which pressure can be applied to the pipe. If chambers 10 were separate and not connected, there would be positions intermediate chamber 9 and chambers 10 where fluid pressure could not be applied inwardly. With the present construction, these "blind" positions of no pressure are eliminated and pressure can be applied uniformly to all locations between the chambers throughout the length of the casing.

It is contemplated that any desired number of flexible sleeves 4 can be employed in superposed relation with each inner sleeve having a greater length and projecting longitudinally beyond the outer adjacent sleeve. The number of sleeves employed and hence the number of fluid-tight chambers and length of the chambers depends upon the particular curing operation involved and the magnitude of pressure desired.

The end portions 6 of the sleeves 4 are sealed to the inner wall of casing 1 and the sleeves themselves are restrained against longitudinal movement by a pair of annular flanged caps 12 which are threadedly engaged to the ends of the casing 1. By threading the caps 12 down on the casing, the caps engage the outermost rings 7 and force each pair of rings 7 together to compress the end portions 6 disposed therebetween and thereby force the edges of the sleeves into tight sealing engagement with the inner wall of the casing.

Additional sealing elements such as O-rings may be employed to seal the chambers, if desired, but such elements are ordinarily not necessary for it is not critical to prevent all possible leakage of fluid between chambers.

Fluid pressure is introduced into chambers 9, 10 and 11 through a series of conduits 13 which extend through suitable openings in casing 1 and communicate with the respective chambers. The flow of fluid through each of the conduits 13 to the respective chamber is controlled by a valve 14 to permit fluid pressure to be introduced in any or all of the chambers 9, 10 and 11, as desired. The conduits 13 are connected to a manifold 15 which is supplied with high pressure fluid through conduit 16 from a source of fluid, not shown.

To facilitate the introduction of the pipe 2 within the casing 1, it is contemplated that the conduit 16 may also be connected to a source of vacuum, not shown. By drawing a vacuum through the conduits 13, the sleeves 4 will be expanded in diameter and drawn tightly against the inner edge of the rings 7 so that the pipe 2 may be readily introduced and withdrawn from the casing without damaging or otherwise interfering with the sleeves 4.

It may be desirable to apply heat to the pipe to cure or accelerate the curing of the resin, depending on the resin employed. If the application of heat is deemed necessary for a particular curing operation, steam or other heated fluids may be introduced within chambers 9, 10 and 11. Alternately, the pipe may be heated by any conventional method, such as by applying heat to the mandrel 3 or by heating the pipe externally prior to introducing the same within the casing.

In the operation of the apparatus and method of the invention to cure the pipe 2, a vacuum is initially drawn through line 13 to draw the flexible members outwardly against the rings 7. The leading end of pipe 2 is then introduced within the casing to dispose a length of the pipe in position for the pressure curing operation.

Fluid pressure is then introduced into chamber 9, while closing off chambers 10 and 11 to the pressure by operation of valves 14. The pressure within chamber 9 forces the body 5 of the outermost sleeve inwardly to exert a force against the pipe and drive the air entrapped within the resin and fibers longitudinally outwardly toward the ends of the casing. This is shown in Fig. 2.

Fluid pressure is then introduced into chambers 10, while maintaining the pressure in chamber 9 and preventing the pressure from acting within chambers 11, to force the intermediate sleeve inwardly and exert a force against portions of the pipe on either side of the portion of the pipe to which pressure was initially applied. This is shown in Fig. 3. The pressure acting through chambers 10 against the pipe again drives the entrapped air longitudinally of the pipe.

While maintaining the pressure within chambers 9 and 10, pressure is then introduced into chambers 11 and again the air entrapped in the pipe is driven longitudinally outwardly toward the ends of the pipe.

With the air substantially removed from the length of the pipe to be cured, heat may then be applied, if necessary, to cure the resin and form a resin-bonded fiber reinforced pipe. The pressure within chambers 9, 10 and 11 is maintained on the pipe during the curing cycle.

After the curing cycle has been completed, the pressure is withdrawn from chambers 9, 10 and 11 and a vacuum is drawn therein to expand the flexible sleeves outwardly. The pipe is then moved longitudinally to position a second length within the casing in position to be subjected to the fluid pressure during the curing cycle.

The above procedure is repeated until the entire length of the pipe has been cured. The resulting cured pipe has an improved bond between the resin and fibers and this results in a pipe having increased strength and water resistance.

Various modes of carrying out the invention are contemplated as being within the scope of the following claims particularly pointing out and distinctly claiming the subject matter which is regarded as the invention.

I claim:

1. An apparatus for applying pressure to an elongated article comprising, a hollow casing having openings in the opposite ends thereof to receive the article, a series of concentric flexible sleeves disposed within the casing with the longitudinal centers of the sleeves being in substantial alignment, each sleeve of said series having a greater length than the outwardly adjacent sleeve and the ends of each sleeve being spaced longitudinally from the corresponding ends of the other sleeves, means for sealing the ends of each sleeve to the inner wall of said casing to provide a series of annular fluid-tight chambers extending substantially the length of the casing, and means for initially introducing fluid pressure into the chamber disposed centrally of said series of chambers and for thereafter successively introducing pressure into the chambers adjacent the chamber at the center of said series outwardly to the chambers at the ends of said series to drive the air entrapped in said article outwardly to the ends of the casing.

2. An apparatus for applying pressure to an elongated uncured plastic article during curing of the plastic comprising, a hollow casing having openings in the opposite ends thereof to receive the article, a flexible sleeve disposed within the casing and having the ends thereof disposed in sealing engagement with the inner wall of the casing to provide a fluid-tight chamber therebetween, at least one other flexible sleeve disposed radially inwardly of said first named sleeve and extending longitudinally beyond the ends of said first sleeve, said second sleeve having the ends thereof disposed in sealing engagement with the inner wall of the casing to provide a pair of connecting second chambers adjacent the ends of said first chamber, means for introducing fluid pressure into said first chamber to flex said first sleeve inwardly and exert a force against a portion of said article during curing of the same, and means for introducing fluid pressure into said second chambers a predetermined time after introducing pressure into said first chamber while maintaining said pressure in said first chamber to flex said second sleeve inwardly and exert a force against a second portion of said article during said curing, said second portion being of a substantially greater length than the first portion and said force serving to drive the air entrapped in the article toward the ends of the casing.

3. An apparatus for applying pressure to an elongated uncured plastic article during curing of the plastic comprising, a hollow casing having openings in the opposite ends thereof to receive the article, a series of concentric flexible sleeves disposed within the casing with the longitudinal centers of the sleeves being in substantial alignment, each sleeve of said series having a greater length than the outwardly adjacent sleeve and the ends of each sleeve being spaced longitudinally from the corresponding ends of the other sleeves, means for sealing the ends of each sleeve to the inner wall of said casing, means to apply pressure against the outer surface of the sleeve of shortest length to force the sleeve inwardly and exert a force against a length of the article, and means to successively apply pressure to the outer surface of the sleeves of progressively greater length to exert a force against progressively greater lengths of the article to drive gas entrapped in the article outwardly toward the ends thereof.

4. An apparatus for applying pressure to an elongated article comprising, a hollow casing having openings in the opposite ends thereof to receive the article, a flexible sleeve disposed within the casing and having the ends thereof disposed in sealing engagement with the inner wall of the casing to provide a fluid-tight chamber therebetween, at least a second flexible sleeve disposed radially inwardly of said first named sleeve and extending longitudinally beyond the ends of said first sleeve, said second sleeve having the ends thereof disposed in sealing engagement with the inner wall of the casing, means to expand said sleeves outwardly toward the casing to permit the article to be freely received within the casing, and means for applying fluid pressure to the outer surface of said first sleeve to force the sleeve inwardly and exert a force against the periphery of a length of the article and for subsequently applying fluid pressure to the outer surface of the second sleeve while maintaining the pressure on said first sleeve to exert a force against the periphery of a second length of the article, said second length being of greater magnitude than said first length and extending longitudinally beyond the ends of said first length, said pressure tending to drive gas entrapped in the lengths of the article longitudinally toward the ends of the article.

5. An apparatus for applying pressure to an elongated uncured plastic article during curing of the plastic comprising, a hollow casing having openings in the opposite ends thereof to receive the article, a series of concentric flexible sleeves disposed within the casing with the longitudinal centers of the sleeves being in substantial alignment, each sleeve of said series having a greater length than the outwardly adjacent sleeve and having end portions extending radially outwardly from the body portion of the sleeve and disposed in sealing engagement with the inner wall of said casing to provide a series of annular chambers extending substantially the length of the casing, a stiffener ring disposed on each side of the end portions of each sleeve to prevent collapse of the body portion of said sleeves against the inner wall of the casing, a series of spacer members disposed adjacent the inner wall of said casing and extending between adjacent stiffener rings to prevent longitudinal displacement of said end portions of said sleeves with respect to said casing, means to force the stiffener rings confining each end portion together to compress the inetrmediate end portion and force the same into sealing engagement with the inner wall of the casing, and means for initially introducing fluid pressure into the chamber disposed centrally of said series of chambers and for thereafter successively introducing pressure into the chambers adjacent the chamber at the center of said series outwardly to the chambers at the ends of said series to drive the air entrapped in said article outwardly to the ends of the casing.

6. A method of applying pressure to an elongated article in preparation for curing of the same, comprising applying fluid pressure to the entire outer peripheral surface of a longitudinally central length of the article, and subsequently applying fluid pressure to second lengths of the article on either side of the first length while maintaining the pressure on said first length to drive the air entrapped in said lengths longitudinally toward the ends of said article in preparation for curing of said article.

7. A method of curing a section of fiber reinforced resin pipe comprising applying fluid pressure to the outer peripheral surface of a longitudinally extending zone of the pipe disposed longitudinally centrally of the pipe while restraining the pressure on the inner surface of the pipe, progressively applying fluid pressure from said first zone longitudinally outwardly toward each end of said pipe in a series of overlapping longitudinally extending zones to drive the air entrapped in said pipe longitudinally outward toward the ends thereof, and curing the resin while maintaining the fluid pressure on said zones to produce a resin-bonded fibrous structure having improved strength and water resistance.

References Cited in the file of this patent
UNITED STATES PATENTS

| | | |
|---|---|---|
| 1,707,794 | Blaker | Apr. 2, 1929 |
| 2,531,218 | Johnson | Nov. 21, 1950 |
| 2,628,177 | Boicey et al. | Feb. 10, 1953 |